United States Patent [19]

Park

[11] Patent Number: 5,343,262
[45] Date of Patent: Aug. 30, 1994

[54] PORTABLE LCD PROJECTOR

[75] Inventor: Hong C. Park, Seoul, Rep. of Korea

[73] Assignee: Goldstar, Co., Ltd., Seoul, Rep. of Korea

[21] Appl. No.: 998,748

[22] Filed: Dec. 30, 1992

[30] Foreign Application Priority Data

Dec. 30, 1991 [KR] Rep. of Korea ............... 25257/1991

[51] Int. Cl.$^5$ ............................................. G03D 21/10
[52] U.S. Cl. ............................ 353/119; 353/77; 353/78
[58] Field of Search .................. 353/74, 75, 77, 78, 353/79, 98, 99, 119, 37, 95, 96; 358/60, 231, 254

[56] References Cited

U.S. PATENT DOCUMENTS

| | | | |
|---|---|---|---|
| 4,645,319 | 2/1987 | Fekete | 353/37 |
| 4,647,166 | 3/1987 | Franken | 353/79 |
| 4,730,919 | 3/1988 | Schuch | 353/79 |
| 4,875,064 | 10/1989 | Umeda et al. | 353/78 |
| 5,004,336 | 4/1991 | Saijo et al. | 353/77 |
| 5,090,800 | 2/1992 | Ushiro | 353/77 |

Primary Examiner—William A. Cuchlinski, Jr.
Assistant Examiner—Willam C. Dowling

[57] ABSTRACT

A portable liquid crystal display (LCD) projector with a bag type housing containing therein an optical part and a mechanical part which is capable of being used in both front projection type and rear projection type and enhancing the carrying performance while having a proper screen size. The projector includes a fixed mirror and a movable mirror disposed between a projection screen and a screen, and a fixed LCD mirror disposed between the LCD and the projection lens. The screen is detachably mounted to a screen holder which is movably mounted to a housing and provided with a rectangular transmitting hole and mounted to the screen holder is a mirror holder attached with the movable mirror.

33 Claims, 3 Drawing Sheets

PORTABLE LCD PROJECTOR

BACKGROUND OF THE INVENTION

1. Field of the Invention

The present invention relates to a liquid crystal display (LCD) projector, and more particularly to a portable LCD projector including an optical part and a mechanical part both contained in a bag-type housing.

2. Description of the Prior Art

Various types of portable television sets are known such as a cathode-ray tube (CRT) television set having a screen of about five to six inches and, an LCD pocket television set having a screen of about three to four inches and using a back light illuminated at the rear side of a color LCD.

A typical rear projection type LCD projector is illustrated in FIG. 1 which comprises a lighting unit, an image display unit and a projection unit. The lighting unit includes a lamp 1, a reflector 2 and a condensing lens 3. The image display unit is an LCD 5 which is driven by a television circuit 4. And the projection unit includes a projection lens 6 and a rear projection type screen 7 which forms an image projected from the LCD 5 and diffracts an incident light toward a viewer side. The lighting unit is adapted to condense a light emitted from the lamp 1 and illuminate uniformly the LCD 5, and the LCD 5 is adapted to control the transmittance of light depending upon the television image by being driven by the image signals which are input from the television circuit 4.

The projection lens 6 of the projection unit is adapted to form a picture on the rear projection screen 7 by projecting a light from the LCD 5 and the rear projection screen 7 disperses the light at various angles to make the brightness of screen uniform and allows the screen to be watched at various directions.

In accordance with the prior art as discussed above, however, the portable television sets such as the small-sized CRT television and the LCD television, are limited in their screen size to five to six inches or three to four inches, so that it is unsuitable to fully enjoy the picture image; Also, the rear projection type LCD projector may have a relatively large sized screen and therefore inconvenient to carry.

SUMMARY OF THE INVENTION

Accordingly, it is an object of the present invention to provide a portable LCD projector which has not only a large-sized screen but is convenient to carry.

Another object of the present invention is to provide a portable projector which is able to be used in both the rear projection type and the front projection type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a portable LCD projector which comprises a lighting unit for converting a light emitted from a light source into a paralled light; a liquid crystal display (LCD) for controlling a transmission amount of light emitted from the lighting unit by being driven by a television circuit; a first conversion unit for changing a path of an image which has been formed by the LCD; a projection lens for magnifying the image from the first conversion unit at a predetermined rate; a second conversion unit for reflecting the image magnified by the projection lens at a predetermined angle; a screen for forming the image reflected by the second conversion unit; and a housing for containing therein the lighting unit, LCD, first conversion unit, projection lens, second conversion unit and screen.

The rear projection screen is detachably mounted to the screen holder which is rotatably mounted to a housing and provided with a rectangular transmitting hole. Thus, when the portable LCD projector according to the present invention is used as a rear projection type, the projector may be operated under a condition that the screen is inserted in the screen holder. While in case that the projector is to be used as a front projection type, the screen is removed from the screen holder and then a front projection screen is provided at a position in front of the screen holder. Thus, a light reflected by the movable mirror passes through the transmitting hole of the screen holder and then forms an image on the front projection screen.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
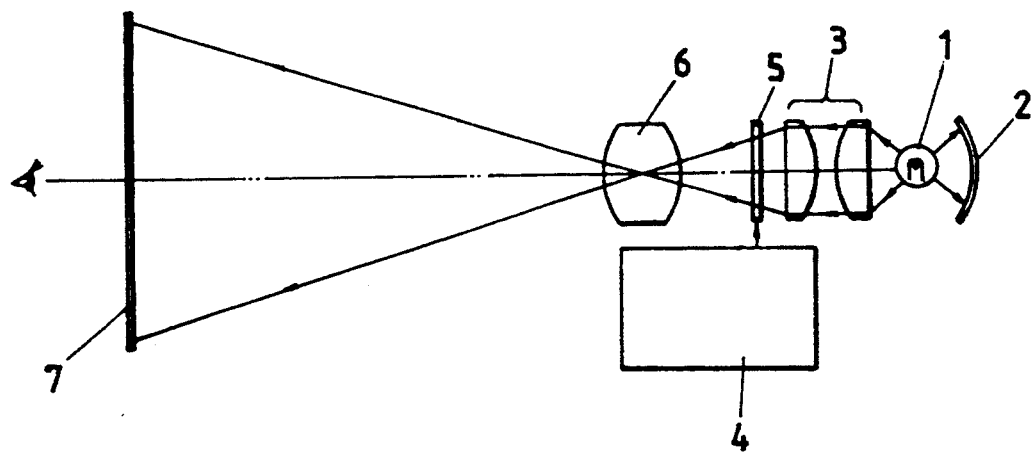
FIG. 1 is a view showing the configuration of a conventional rear projection type LCD projector.
Figure 2:
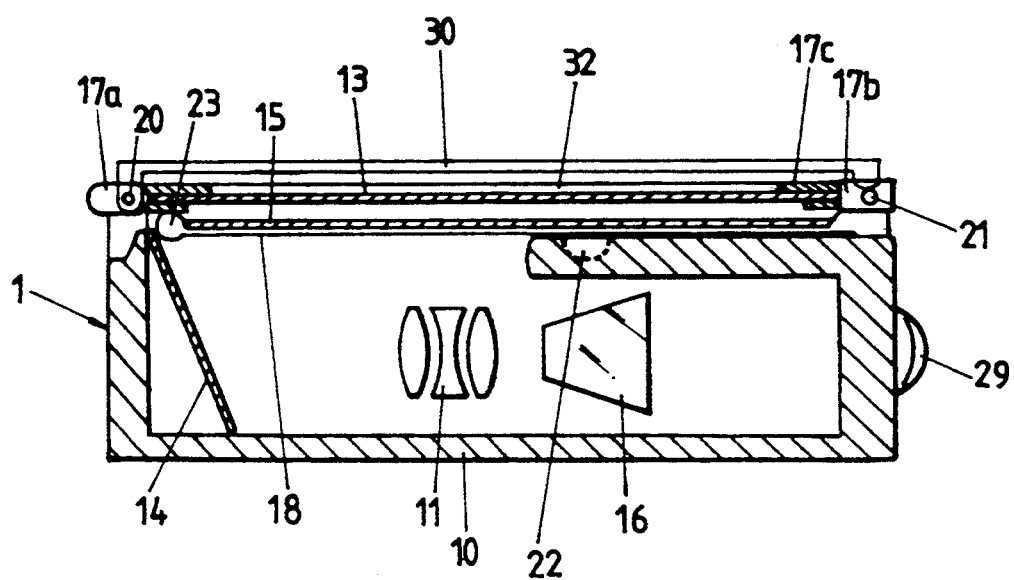
FIG. 2 is a schematic sectional view showing a portable LCD projector of the present invention which is in a carrying state.
Figure 3:
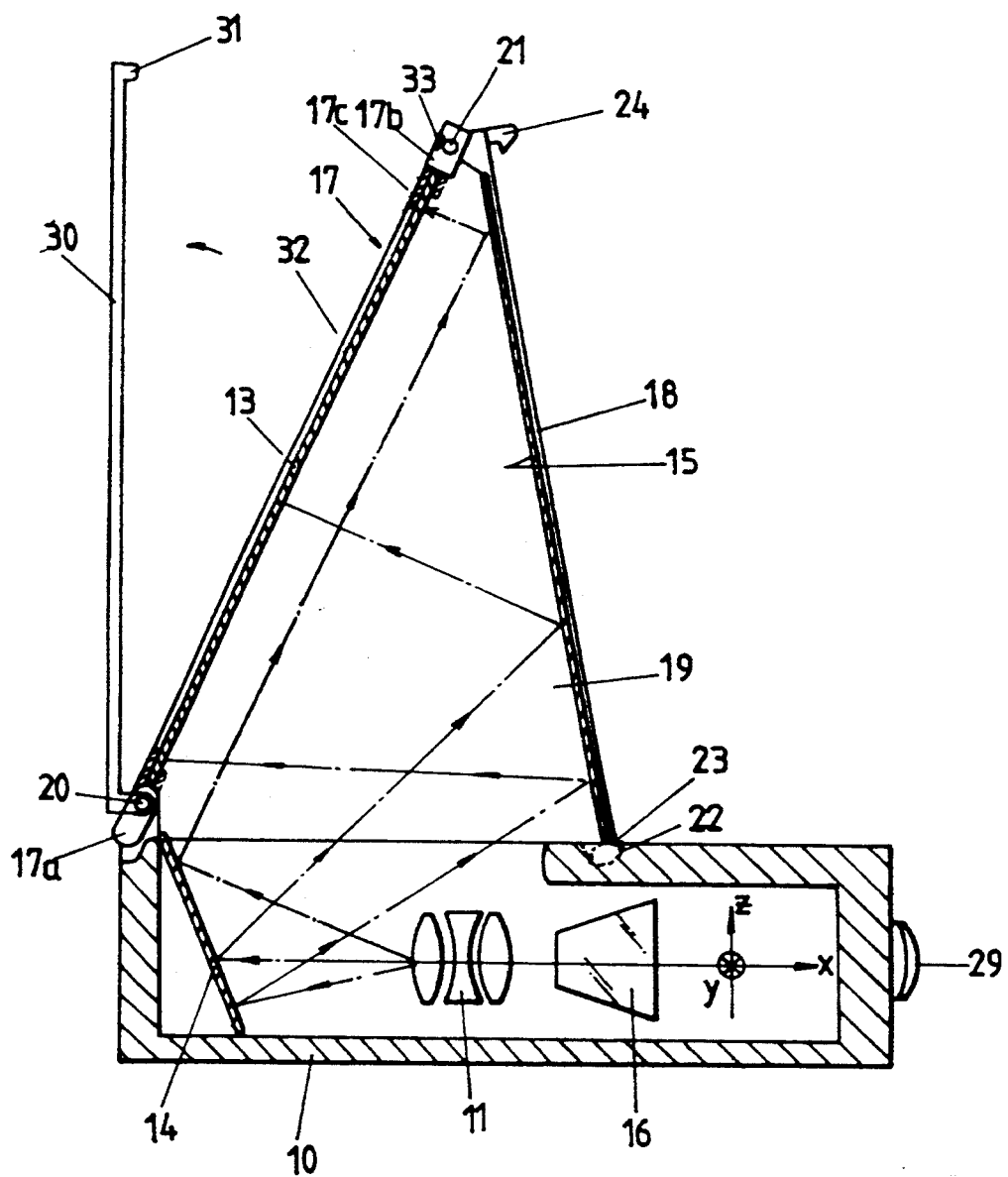
FIG. 3 is a sectional view showing the portable LCD projector of the present invention which is in an operation state.

Referring now in detail to the drawings for the purpose of illustrating preferred embodiments of the present invention, the portable LCD projector as shown in FIGS. 2 and 3 comprises generally an optical part and a mechanical part, both parts being contained in a bag type housing 1.

The optical part includes a projection lens 11, an LCD 12, a screen 13, an LCD mirror 16 disposed between the LCD 12 and the projection lens 11, a fixed mirror (first projection mirror) 14 disposed between the projection mirror 11 and the screen 13, and a movable mirror (second projection mirror) 15 which has a mechanical properties to be easily folded. The movable mirror 15 is, of course, in a fixed state in operation.

The LCD mirror 16 leads a light which has passed through the LCD 12 toward the projection lens 11 and the fixed mirror 14 and the movable mirror 15 convert the advancing direction of the light transmitted through the projection mirror 11 and then project the light on the screen 13. By such an arrangement, the light path suitable for a screen of about fourteen inches may be obtained within the space of the housing 1.

On the other hand, the mechanical part, in operation, allows the two projection mirrors, i.e., the fixed mirror 14 and the movable mirror 15, and the screen 13 to be maintained at an angle at which a normal operation may be carried out, while in non-use such as a carrying state, the movable mirror 15 and the screen 13 are folded on the outer casing 10 so as to be carried in a bag type.

The screen holder assembly 17 includes a screen holder 17c and screen fixing members 17a and 17b. The screen holder 17c is fixedly supported by the screen fixing members 17a and 17b and the screen 13 is detachably mounted to the screen holder 17c. That is, in a rear projection or non-use of the projector, the screen 13 is inserted in the screen holder 17c while in a front projection, the screen 13 is removed from the screen holder 17c. Also, the screen holder 17c is provided with a rectangular transmitting hole 32 which is slightly smaller than the screen 13 so as to be compatibly used in the rear projection and front projection.

The screen fixing member 17a is rotatably mounted on the upper peripheral portion of the outer casing 10 by means of a hinge 20. One end of the screen holder 17c is fixed to the screen fixing member 17a and the other end thereof is fixed to the outer screen fixing member 17b.

Figure 4:
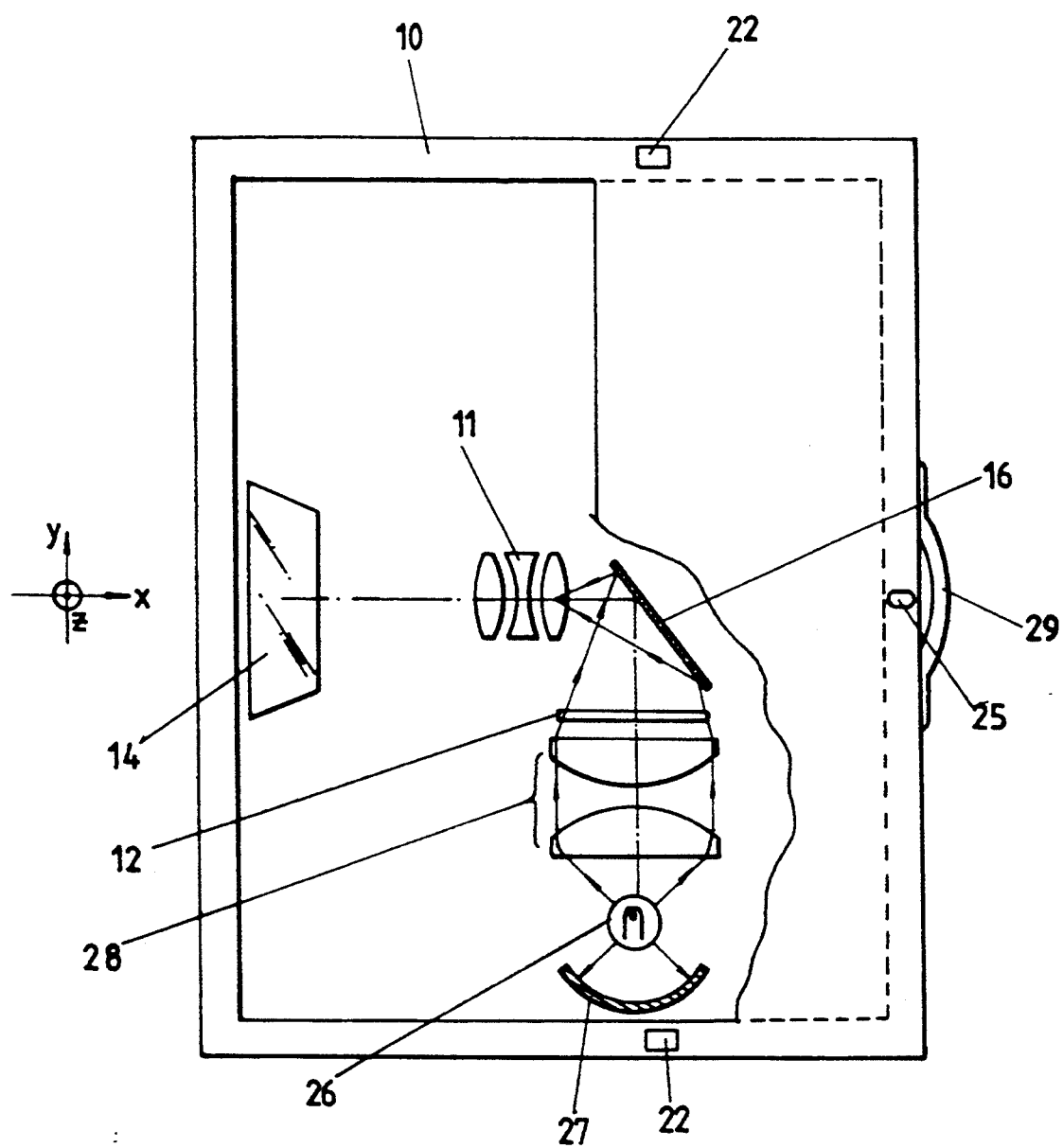
FIG. 4 is a partial sectional view showing the configuration of the portable LCD projector of the present invention.

Rotatably coupled to the screen fixing member 17b is a mirror holder 18 having the movable mirror 15 at the inner surface thereof by means of a hinge 21. At the other end of the mirror holder 18, a pair of support pieces 23 which are inserted in a pair of hooking grooves 22 formed at the upper surface of the outer casing 10 are provided so that the movable mirror 15 may be maintained at a precise operation angle. At the upper portion of the mirror holder 18, a locker 24 is provided which is adapted to be hooked to a hooking groove 25 is formed at the outer casing 10, as shown in FIG. 4.

In addition, at both sides of the screen holder 17c and the mirror holder 18, triangular external light cutoff curtains 19 are provided which prevent the contrast from being deteriorated by an external light. The curtains 19 preferably may be made by pleated material. That is, the curtains 19 are folded between the screen 13 and the movable mirror 15 in unuse state while in an operation state, they are streched to cut off external light.

In the drawings, reference numeral 26 is a lamp, 27 a reflector, 28 a condensing lens and 29 a handle.

The portable LCD projector of the present invention operates as follows:

FIG. 2 shows the portable LCD projector which is in a non-use state in which the locker 24 is locked to the hooking groove 25 of the outer casing 10. In this state, the locker 31 is also locked to the hooking groove of the screen assembly 17b so that the screen 13 may not be exposed by the screen cover 30.

When the portable LCD projector is used as a rear projection type, the locker 24 is released from the hooking groove 25 of the outer casing 10, and then the screen 13 is rotated around the hinge 20 in counterclockwise, as shown in FIG. 3. Thereafter, the support pieces 23 of the mirror holder 18 are inserted to the hooking grooves 22 of the outer casing 10 and the locker 31 of the screen cover 30 is released from the hooking groove 33 formed at the upper portion of the screen fixing member 17b. Then the screen cover 30 is rotated around the hinge 20 in counterclockwise so that the screen 13 is exposed and the elements of the optical and mechanical parts are disposed at their operation positions.

In this state, the light emitted from the lamp 26 advances in the direction (y), as shown in FIG. 4, and is reflected at the LCD mirror 16 and then being incident upon the projection lens 11 in the direction (−x). The light which has passed through the projection lens 11 further advances in the direction (−x) and then projected on the screen 13 after being reflected at the fixed mirror 14 and the movable mirror 15. At this moment, since the screen 13 is maintained at a predetermined inclined angle, it is possible to conveniently watch the screen 13.

Although it has been described that the portable LCD projector is used as a rear projection type, the projector of the present invention may be operated for the front projection. In such case, the rear projection screen 13 should be removed from the screen holder 17c and then a separate front projection screen (not shown) is disposed at a predetermined position in front of the screen holder 17c. At this moment, a light which is reflected at the fixed mirror 14 and the movable mirror 15 passes through the transmitting hole 32 formed at the screen holder 17c, without any restriction by the screen 13 because the screen 13 has been removed from the screen holder 17c, and then projected on the front projection lens.

In this case, when the optical units which have been disposed for the rear projection are used for the front projection as they are, an inverted image is formed on the front projection screen. Thus, it is required to invert the image which is outputted from the LCD 12.

As described above in detail, the present invention provides the effect that it is convenient to carry the LCD projector even it has a relatively larger sized screen by the arrangement of the bag type housing containing therein the optical and mechanical parts. Also, it is possible to use the LCD projector of the present invention as a rear projection and a front projection as well.

Thus invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A portable LCD projector, comprising:
  lighting means .for converting light emitted from a light source into parallel light;
  a liquid crystal display (LCD) for controlling transmission of the parallel light from said lighting means;
  first conversion means for changing a path of an image formed by said LCD;
  a projection lens for magnifying the image from said first conversion means at a predetermined rate;
  second conversion means for reflecting the image magnified by said projection lens at a predetermined angle;
  a screen for forming the image reflected by said second conversion means; and
  a housing for containing therein said lighting means, LCD, first conversion means, projection lens, second conversion means, and said screen; wherein said second conversion means is hingedly attached to said housing.

2. The projector of claim 1, wherein said first conversion means is a total reflective mirror for reflecting the image from said LCD at a predetermined angle.

3. The projector of claim 1, wherein said second conversion means includes:
a fixed mirror for reflecting the image magnified by said projection lens at the predetermined angle; and
a movable mirror for reflecting the image reflected by said fixed mirror toward said screen to form the image.

4. The projector of claim 1, wherein said screen is detachably provided in said housing so as to be used in both front and rear projection types.

5. The projector of claim 3, wherein said housing includes:
an outer casing for mounting therein said lighting means, said LCD, said projection lens, said first conversion means, and said fixed mirror of said second conversion means;
a mirror holder for supporting said movable mirror of said second conversion means;
a screen holder assembly having an end thereof coupled to said movable mirror and another end thereof hingedly coupled to said outer casing; and
a screen cover for protecting said screen mounted to said screen holder assembly.

6. The projector of claim 5, wherein said outer casing is provided with a hooking groove for fixing one end of said mirror holder to incline said screen.

7. The projector of claim 5, wherein said outer casing further comprises a handle.

8. The projector of claim 5, wherein said screen holder assembly includes:
supporting means having a transmitting hole, slightly smaller than said screen for supporting said screen; and
a screen fixing member for fixing said supporting means.

9. The projector of claim 5, wherein said screen cover includes one end rotatably fixed to said outer casing and said other end fixed to the screen holder assembly.

10. The projector of claim 5, wherein said mirror holder and said screen holder assembly are fixed to said outer casing by a locker.

11. The projector of claim 5, wherein said screen and said movable mirror constitute two sides of a triangle.

12. The projector of claim 5, wherein external light cutoff curtains are provided at outer surfaces of said screen holder and said mirror holder assembly.

13. The projector of claim 12, wherein said external light cutoff curtains are folded between said screen holder and said mirror holder assembly.

14. The projector of claim 1, wherein said screen is detachably provided in said housing means so as to be used in both front and rear projection types.

15. A portable LCD projector, comprising:
optical means for directing light from a light source onto a screen; and
mechanical means, including fixed mirror means, movable mirror means, and housing means, wherein during operation of said portable LCD projector, said movable mirror means and said screen are maintained at a predetermined angle and during non-operation of said portable LCD projector, said movable mirror means are folded flat with said housing.

wherein said screen is detachably provided in said housing mean so as to be used in both front and rear projection types.

16. The projector of claim 15, wherein said housing means includes:
an outer casing;
a mirror holder for supporting said movable mirror means;
a screen holder assembly having an end thereof coupled to said movable mirror means and another end thereof hingedly coupled to said outer casing; and
a screen cover for protecting said screen mounted to said screen holder assembly.

17. The projector of claim 16, wherein said outer casing is provided with hooking groove for fixing one end of said mirror holder to incline said screen.

18. The projector of claim 16, wherein said outer casing further comprises a handle.

19. The projector of claim 16, wherein said screen holder assembly includes:
supporting means having a transmitting hole, slightly smaller than said screen for supporting said screen; and
a screen fixing member for fixing said supporting means.

20. The projector of claim 16, wherein said screen cover includes one end rotatably fixed to said outer casing and the other end fixed to said screen holder assembly.

21. The projector of claim 16, wherein said mirror holder and said screen holder assembly are fixed to said outer casing by a locker.

22. The projector of claim 16, wherein said screen and said movable mirror means constitute two sides of a triangle.

23. The projector of claim 16, wherein external light cutoff curtains are provided at outer surfaces of said screen holder and said mirror holder assembly.

24. The projector of claim 16, wherein said external light cutoff curtains are folded between said screen holder and said mirror holder assembly.

25. A projector comprising:
optical means, including a fixed mirror and a movable mirror for directing light from a light source onto a screen; and
housing means for housing said optical means, said housing means including,
an outer casing;
a mirror holder for supporting said movable mirror,
a screen holder assembly having an end thereof coupled to said movable mirror and another end thereof hingedly coupled to said outer casing, and
a screen cover for protecting said screen mounted to said screen holder assembly.

26. The projector of claim 25, wherein said outer casing is provided with hooking groove for fixing one end of said mirror holder to incline said screen.

27. The projector of claim 25 wherein said outer casing further comprises a handle.

28. The projector of claim 25, wherein said screen holder assembly includes:
supporting means having a transmitting hole, slightly smaller than said screen for supporting said screen; and
a screen fixing member for fixing said supporting means.

29. The projector of claim 25, wherein said screen cover includes one end rotatably fixed to said outer casing and the other end fixed to said screen holder assembly.

30. The projector of claim 25, wherein said mirror holder and said screen holder assembly are fixed to said outer casing by a locker.

31. The projector of claim 25, wherein said screen and said movable mirror constitute two sides of a triangle.

32. The projector of claim 25, wherein external light cutoff curtains are provided at outer surfaces of said screen holder and said mirror holder assembly.

33. The projector of claim 25, wherein said external light cutoff curtains are folded between said screen holder and said mirror holder assembly.

* * * * *